Figure 1:
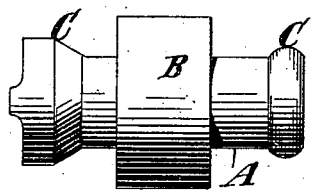

(No Model.)

B. F. SUTTON.
SYRINGE TUBE COUPLING.

No. 354,875. Patented Dec. 21, 1886.

Witnesses.
Emil Herter
C. Sundgren

Inventor
Benj Franklin Sutton
by his attys
Brown & Hall

UNITED STATES PATENT OFFICE.

BENJAMIN F. SUTTON, OF BROOKLYN, ASSIGNOR TO PARKER, STEARNS & SUTTON, OF NEW YORK, N. Y.

SYRINGE-TUBE COUPLING.

SPECIFICATION forming part of Letters Patent No. 354,875, dated December 21, 1886.

Application filed September 20, 1886. Serial No. 214,078. (No model.)

*To all whom it may concern:*

Be it known that I, BENJAMIN FRANKLIN SUTTON, of Brooklyn, in the county of Kings and State of New York, have invented a new and useful Improvement in Couplings for Syringe-Tubes and Analogous Purposes, of which the following is a specification.

My invention is more particularly intended for couplings which are employed for connecting the tubes or tubular portions of syringes; and it relates to those couplings in which the tubes or portions which are to be united are made of elastic or flexible material—such as soft india-rubber—and are sprung over the end portions of the coupling, or which, in other words, receive the end portions of the coupling within them, and are retained in place on the coupling wholly or in part by their contractile elasticity. Such couplings as heretofore constructed have been provided at about the center of their length with a fixed collar or portion of enlarged diameter, against which abut the tubes or tubular portions sprung onto opposite ends of the coupling, and which is formed in one integral piece of metal with the coupling.

The invention may be embodied in simple couplings which are designed solely for connecting two tubes or tubular portions, or in couplings which contain within them valves, and which not only serve as couplings, but also serve as valve-chambers. Ordinarily such valve-chambers or couplings have been made of soft metal—such as may be readily melted and cast in a mold—and the collars or enlarged portions against which the ends of the tubes or tubular portions have abutted have been made integral with the coupling, and hence have been necessarily finished or turned in a lathe to give them a presentable appearance.

The object of my invention is to reduce the expense of such couplings, whether constituting simple couplings or made in the form of valve-chambers also; and my invention consists in a coupling for syringe-tubes and analogous purposes consisting of a tubular portion formed in one piece from end to end and having its ends adapted to enter the tubes, and a central collar made separate from and surrounding the coupling, and against which the tubes may abut. The collars for the couplings may be advantageously formed by simply taking a hard-rubber tube of any length and cutting it transversely into rings or collars of the necessary dimensions, and these collars or rings may then be placed in the mold and the metal to form the couplings may be poured in. By such operation the soft metal, which comprises tin as a usual ingredient, may be run into the mold and through the collar or ring portion confined therein, and will be combined with the collar or ring portion by means of engaging-shoulders, which hold the collar or ring portion in proper position upon the coupling.

The features of construction which are above referred to are also included in my invention.

Figure 2:
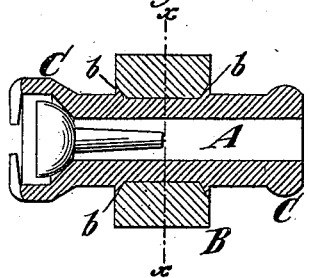
Figure 3:
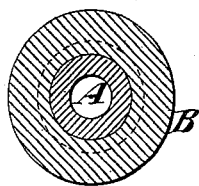
Figure 4:
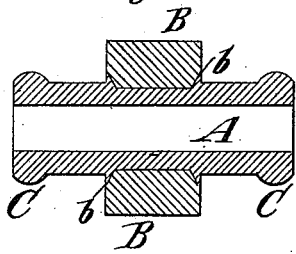

In the accompanying drawings, Figure 1 is a side view of a coupling also constituting a valve-chamber which embodies my invention. Fig. 2 is an axial section thereof. Fig. 3 is a transverse section upon the plane of the dotted line *x x*, Fig. 2; and Fig. 4 is an axial section of a simple coupling which is intended for connecting plain tubes or tubular portions, and which does not constitute a valve-chamber.

Similar letters of reference designate corresponding parts in all the figures.

In the examples of my invention shown, A designates the coupling proper, which is made of some sort of soft metal, usually comprising tin as a large ingredient, and which may be readily cast in a metal mold. At about the center of the length of the coupling is a collar or annular enlargement or ring, B, and on opposite sides of this collar or enlargement B are the end portions, C, of the coupling, which are larger in diameter than the body, and over which tubes or tubular portions—such as are made of elastic and flexible india-rubber—are to be sprung. The tubes or tubular portions will then receive within them the end portions, C, of the coupling, and will be retained thereon by their contractile elasticity, and the ends of the tubes or tubular portions will usually abut against the collar or enlargement B.

In the couplings commonly employed for syringes and analogous purposes the collar or enlargement B has been made in the same integral piece of metal with the coupling, and has had to be turned or finished.

According to my present invention, I make this collar B of a piece which is separate from the coupling proper, or which is made separate therefrom, and the collar B is inserted in the metal mold, and the soft metal to form the coupling proper is poured in, filling the free space of the mold and the open center of the collar or ring B. The collars or rings B may be advantageously formed of hard vulcanized india-rubber or vulcanite. They may be cut off of suitable dimensions from a tube of such material, and their opposite sides may, if desired, be chamfered inward, as shown at b. They may be of such internal diameter and the coupling proper, A, of such external size that the ring or collar B will be held in place by the beveled or inclined shoulders b at its opposite sides, fitting corresponding shoulders on the coupling proper, A, which is cast within it. The tube from which the rings or collars B are cut may be finished or produced in a finished state when of considerable length, and all the labor necessary to form the collars is simply to cut the tube transversely at the proper points, and, if desired, to bevel the opposite sides to form the beveled shoulders b. It is, however, not necessary to so bevel or incline the opposite sides of the collar or ring B, as the opposite sides may be left straight, and the shoulders formed upon the metal of the coupling A, which is cast within the ring or collar, will conform to such shape.

In order to form a neat finish when the tubes or tubular portions are joined to the coupling A, it is necessary that some collar or enlargement should be provided for such tubes or tubular portions to abut against, and by making the ring or collar B separate from the coupling proper, A, and of a material—such, for example, as hard india-rubber—which may be finished prior to the incorporation of the rings or collars with the coupling proper, A, by the operation of casting, the cost of manufacturing an article of presentable appearance is greatly reduced.

What I claim as my invention, and desire to secure by Letters Patent, is—

1. A coupling for syringe-tubes and analogous purposes, consisting of the tubular portion A, formed in one piece from end to end, and the ends of which are adapted to enter the tubes, and a central collar, B, made separate from and surrounding the portion A, and against which the tubes may abut, substantially as herein described.

2. A metallic coupling for syringe-tubes and analogous purposes, having end portions for entering the tubes, and a collar of hard india-rubber made separate from and surrounding the coupling, substantially as herein described.

3. A coupling for syringe-tubes and analogous purposes, having end portions for entering the tubes, and a collar made separate from and surrounding the coupling and confined lengthwise thereon by shoulders, substantially as herein described.

BENJAMIN F. SUTTON.

Witnesses:
FREDK. HAYNES,
HENRY J. MCBRIDE.